(12) United States Patent
Jones

(10) Patent No.: US 9,296,482 B2
(45) Date of Patent: Mar. 29, 2016

(54) TRACK FITTING ASSEMBLY HAVING A VISIBLE INDICATOR TO CONFIRM ENGAGEMENT WITH A TRACK

(71) Applicant: The Boeing Company, Chicago, IL (US)

(72) Inventor: Timothy M. Jones, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 53 days.

(21) Appl. No.: 14/149,189

(22) Filed: Jan. 7, 2014

(65) Prior Publication Data

US 2015/0192162 A1 Jul. 9, 2015

(51) Int. Cl.
*B60P 7/08* (2006.01)
*B64D 11/06* (2006.01)

(52) U.S. Cl.
CPC ........... *B64D 11/0696* (2013.01); *B60P 7/0815* (2013.01); *Y10T 403/20* (2015.01)

(58) Field of Classification Search
CPC .......................... B60P 7/0815; B64D 11/0696
USPC ............... 410/101, 102, 104, 105, 77, 80, 81; 244/118.1
See application file for complete search history.

(56) References Cited

U.S. PATENT DOCUMENTS

| 4,230,432 A | 10/1980 | Howell |
| 5,762,296 A | 6/1998 | Gilbert |
| 5,871,318 A | 2/1999 | Dixon et al. |
| 7,438,511 B2 * | 10/2008 | Legeay ........................ 410/105 |
| 2006/0104740 A1 | 5/2006 | Girardin et al. |

FOREIGN PATENT DOCUMENTS

WO  2012/100152  7/2012

OTHER PUBLICATIONS

EP, Extended European Search Report and Opinion; European Patent Application No. 15150275.4 (Jun. 19, 2015).
"Seat and Cargo Track Fittings," website of Ancra International, http://www.ancra.com/aircraft/track.html (retrieved from the internet on Dec. 20, 2013).
"Aerofittings," website of ATTAX, http://www.attax.com/eng/products/aerofitting (retrieved from the internet on Dec. 20, 2013).
Catalog of QRP, Inc., p. 32, Part No. QRPS-252-10/20 (Aug. 2012).

* cited by examiner

*Primary Examiner* — Stephen Gordon
(74) *Attorney, Agent, or Firm* — Philip Shipley

(57) ABSTRACT

A track fitting assembly having an engaged position and an unengaged position. The track fitting assembly may include a lower track fitting, a cam member, a button, and a biasing member. The lower track fitting may define a recess therein and at least one retaining feature. The retaining feature may be configured to hold the lower track fitting within a track if the track fitting assembly is in the engaged position. The cam member may have a cam main body that defines an aperture. The button may have an indicator surface. The button may be selectively retained within the recess of the lower track fitting. The biasing member may be configured to exert a biasing force. The biasing member may be retained within the recess of the lower track fitting and positioned relative to the button to exert the biasing force against the button.

18 Claims, 9 Drawing Sheets

TRACK FITTING ASSEMBLY HAVING A VISIBLE INDICATOR TO CONFIRM ENGAGEMENT WITH A TRACK

FIELD

The disclosed system and method relate to a track fitting assembly and, more particularly, to systems and methods for providing a visible indicator to confirm that the track fitting assembly is in an engaged position within a track.

BACKGROUND

A passenger aircraft may include seat tracks that extend along a floor of a cabin. The seat tracks may be used in combination with seat track fittings to affix passenger seats to the floor of the cabin. In addition to passenger seats much larger structures, which are referred to as monuments, may also be affixed to the floor of the cabin as well. Some examples of monuments include, but are not limited to, a partition, a closet, a lavatory, or a galley.

Several approaches currently exist for installing the monument to the seat track. These approaches typically require a first individual to install the seat track fitting to the seat track and a second individual, who may be referred to as a witness, to confirm the installation was performed correctly. For example, in one approach to install the monument, the seat track fittings are first engaged with locating features in the seat track. The seat track fittings are then taped into place along the seat track by the first individual. The witness then confirms that the seat track fittings are correctly installed to the seat track. Once installation is confirmed by the witness, the monument may be secured to the seat track fittings.

In another approach to install the monument, one or more bolts and the seat track fittings are first loosely installed to the monument. The monument is then positioned in place along the seat tracks by the first individual, where a set of locating features of the seat track fitting are disengaged with the seat track. Positioning the monument in place along the seat track may be challenging, as there is typically very limited space between the seat track and the monument. The monument may then be slid along the seat track in either the forward or aft direction, which engages the locating features with the seat track. The witness may then tighten the bolts, thereby installing the monument to the seat track.

Both of these approaches for installing the monument to the seat track have drawbacks. For example, the first individual has to wait for the witness to arrive and confirm that the seat track fittings are correctly installed before the monument may be secured to the seat track. Moreover, it may be difficult to view the seat track fittings clearly within the seat track, especially if the monument has already been installed.

SUMMARY

In one embodiment, a track fitting assembly having an engaged position and an unengaged position. The track fitting assembly may include a lower track fitting, a cam member, a button, and a biasing member. The lower track fitting may define a recess therein and at least one retaining feature. The retaining feature may be configured to hold the lower track fitting within a track if the track fitting assembly is in the engaged position. The cam member may have a cam main body that defines an aperture. The button may have an indicator surface. The button may be selectively retained within the recess of the lower track fitting. The biasing member may be configured to exert a biasing force. The biasing member may be retained within the recess of the lower track fitting and positioned relative to the button to exert the biasing force against the button. The biasing force may urge the button through the aperture of the cam member such that the indicator surface of the button is visible through the aperture of the cam member if the track fitting assembly is in the engaged position.

In another embodiment, a method of actuating a track fitting assembly from an unengaged position to an engaged position may include positioning a lower track fitting within a longitudinal slot of a track. The lower track fitting may define a recess and at least one retaining feature configured to hold the lower track fitting within the track. The method may also include rotating a cam member by a predetermined amount, where the cam member may include an aperture. The method may also include exerting a biasing force on a button by a biasing member. The biasing member may be retained within the recess of the lower track fitting and may be positioned relative to the button to exert the biasing force against the button. The method may also include urging the button through the aperture in the cam member by the biasing force if the track fitting assembly is in the engaged position. The button includes an indicator surface that may be visible through the aperture of the cam member.

Other objects and advantages of the disclosed method and system will be apparent from the following description, the accompanying drawings and the appended claims.

DETAILED DESCRIPTION

Figure 1:
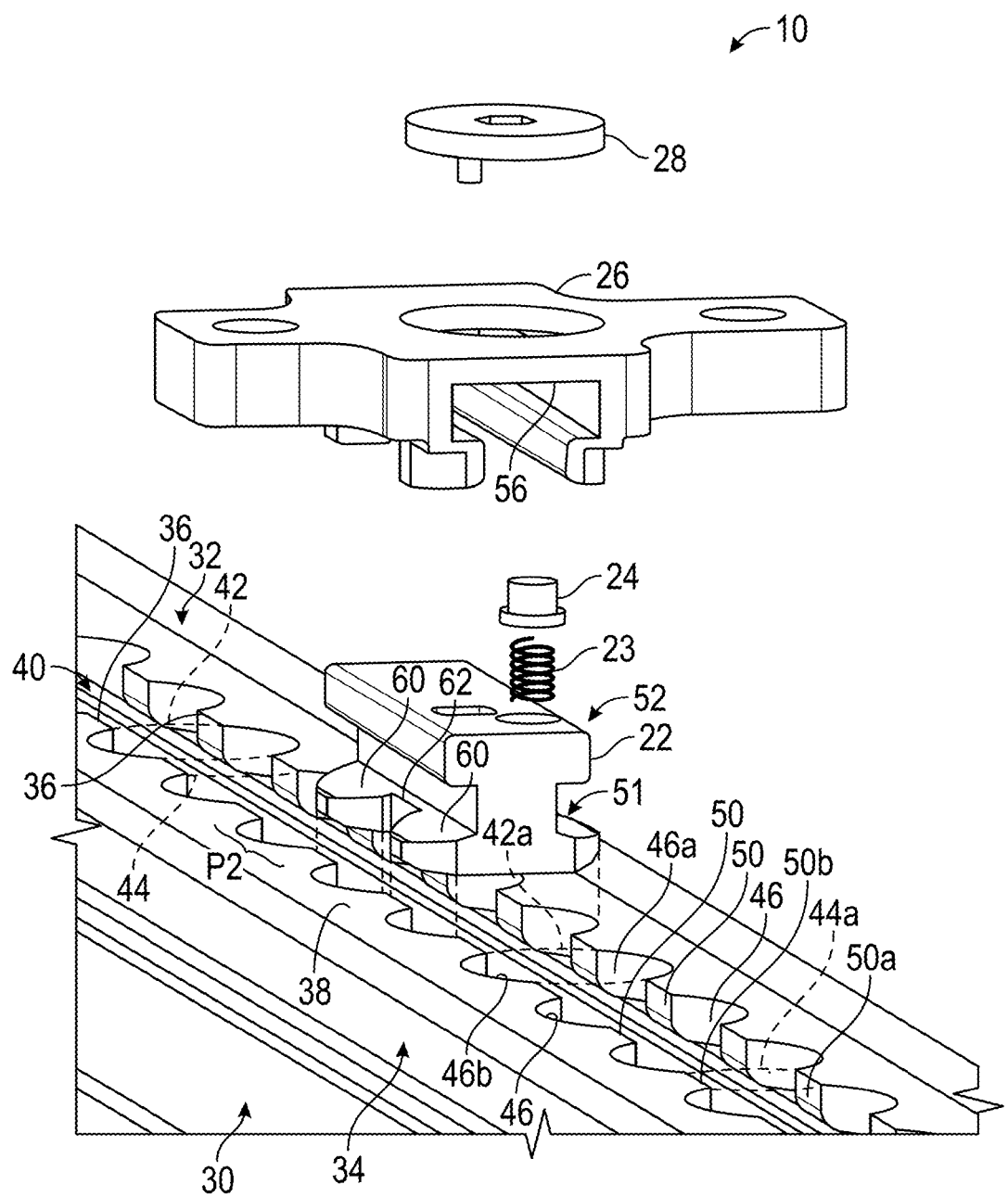
FIG. 1 is an exploded perspective view of an embodiment of the disclosed track fitting assembly and a track.

As shown in FIG. 1, the disclosed track fitting assembly, generally designated 10, may comprise a lower track fitting 22, a biasing member 23, a button 24, an upper track fitting 26, and a cam 28. The track fitting assembly 10 may be used for securing a structure (not shown) to a track 30. In one embodiment, the structure may be any type of device fixedly attached to a floor of an aircraft such as, for example, a passenger seat or a monument. The monument may be any compartmental structure such as, for example, a closet, a lavatory, or a galley. The track 30 may extend along a floor of a cabin of a passenger aircraft (not shown). Although an aircraft is described, it is to be understood that the track fitting assembly 10 and the track 30 may be used in any other application where adjustable rails may be employed as well such as, for example, buses, boats, and shipping cargo bays. The track 30 may include an upper portion 32 and a lower portion 34. The upper portion 32 of the track 30 may include two opposing edges 36 and an upper surface 38. The two opposing edges 36 of the track 30 may define a longitudinal slot 40 for selectively retaining the lower track fitting 22 of the track fitting assembly 10.

In the exemplary embodiment as shown in FIG. 1, each edge 36 of the track 30 may include a series of generally semi-circular recesses 46 and a series of raised sections 50. Although FIG. 1 illustrates semi-circular recesses 46, it is to be understood that the recesses 46 may be include other profiles as well. The recesses 46 located along one of the edges 36 of the track 30 may cooperate with the recesses 46 located along an opposing edge 36 of the track 30 to define a series of holes 42 within the longitudinal slot 40. For example, recess 46a located along one of the edges 36 of the track 30 cooperates with an opposing recess 46b located on the other edge 36 of the track 30 to define a hole 42a. Similarly, the raised sections 50 located along one of the edges 36 of the track 30 may cooperate with the raised sections 50 located on the opposing edge 36 of the track 30 to define a series of lands 44 within the longitudinal slot 40. For example, raised section 50a located along one of the edges 36 of the track 30 cooperates with an opposing raised section 50b located on the other edge 36 of the track 30 to define a land 44a.

Figure 2:
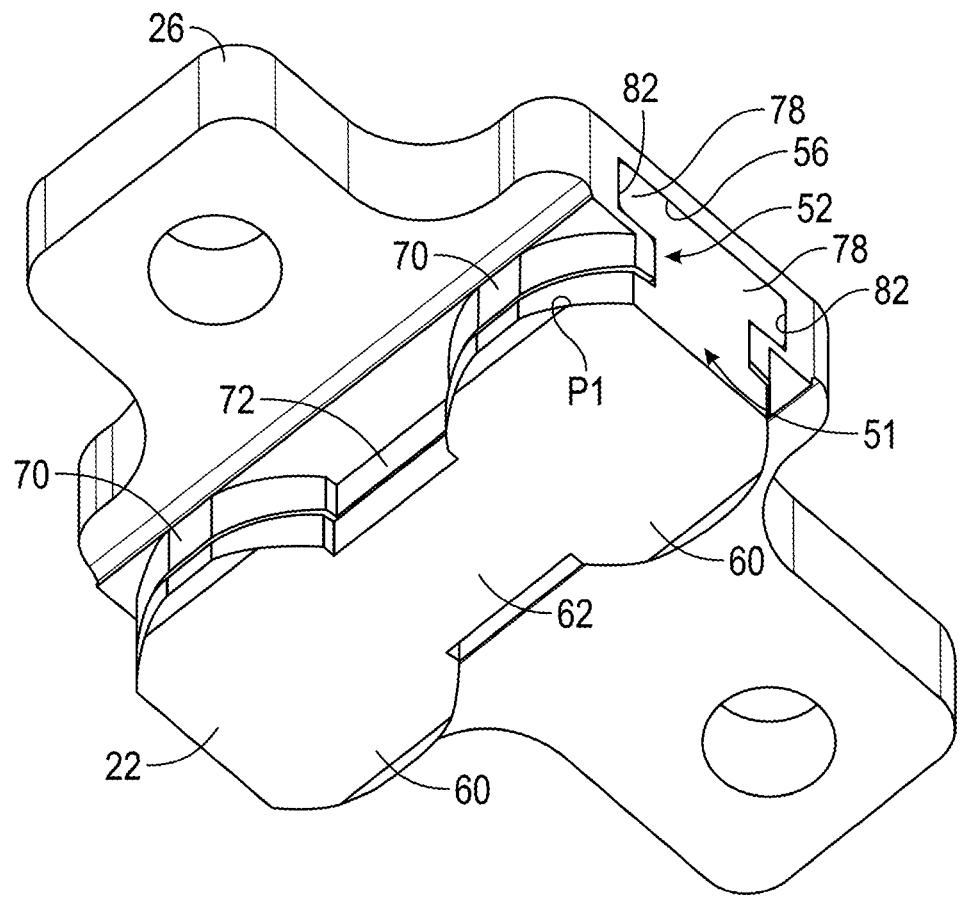
FIG. 2 is a bottom perspective view of a lower track fitting and an upper track fitting shown in FIG. 1.

Referring to both FIGS. 1-2, the lower track fitting 22 may include a bottom section 51 and a upper section 52. The bottom section 51 of the lower track fitting 22 may be selectively received by the longitudinal slot 40 in the track 30 (shown in FIG. 1). The upper section 52 of the lower track fitting 22 may be slidingly engaged with a corresponding longitudinal slot 56 located within the upper track fitting 26. The bottom section 51 of the lower track fitting 22 may include at least one lobed or head portion 60 and at least one neck portion 62. In the exemplary embodiment as shown in FIGS. 1-2, the lower track fitting 22 includes two head portions 60 and a neck portion 62 located between the two head portions 60. In one embodiment, the head portions 60 of the lower track fitting 22 may include a generally circular or rounded profile P1 (shown in FIG. 2) that corresponds with a profile P2 of the holes 42 located within the longitudinal slot 40 of the track 30. Thus, the head portions 60 of the lower track fitting 22 may pass through the holes 42 in the longitudinal slot 40 of the track 30. Similarly, the neck portions 62 of the lower track fitting 22 may also correspond with the lands 44 located within the longitudinal slot 40 of the track 30. Thus, the neck portions 62 of the lower track fitting 22 may also pass through the lands 44 in the longitudinal slot 40 of the track 30.

Referring to FIG. 2, the upper track fitting 26 may also include at least one head portion 70 and at least one neck portion 72. In the exemplary embodiment as shown in FIGS. 1-2, the head portions 70 of the upper track fitting 26 may also have a generally semi-circular profile that corresponds with the holes 42 located within the longitudinal slot 40 of the track 30. Thus, the head portions 70 of the upper track fitting 26 may also pass through the holes 42 in the longitudinal slot 40 of the track 30. Similarly, the neck portions 72 of the upper track fitting 26 may also correspond with the lands 44 located within the longitudinal slot 40 of the track 30. Thus, the neck portions 72 of the upper track fitting 26 also may pass through the lands 44 in the longitudinal slot 40 of the track 30.

Figure 3:
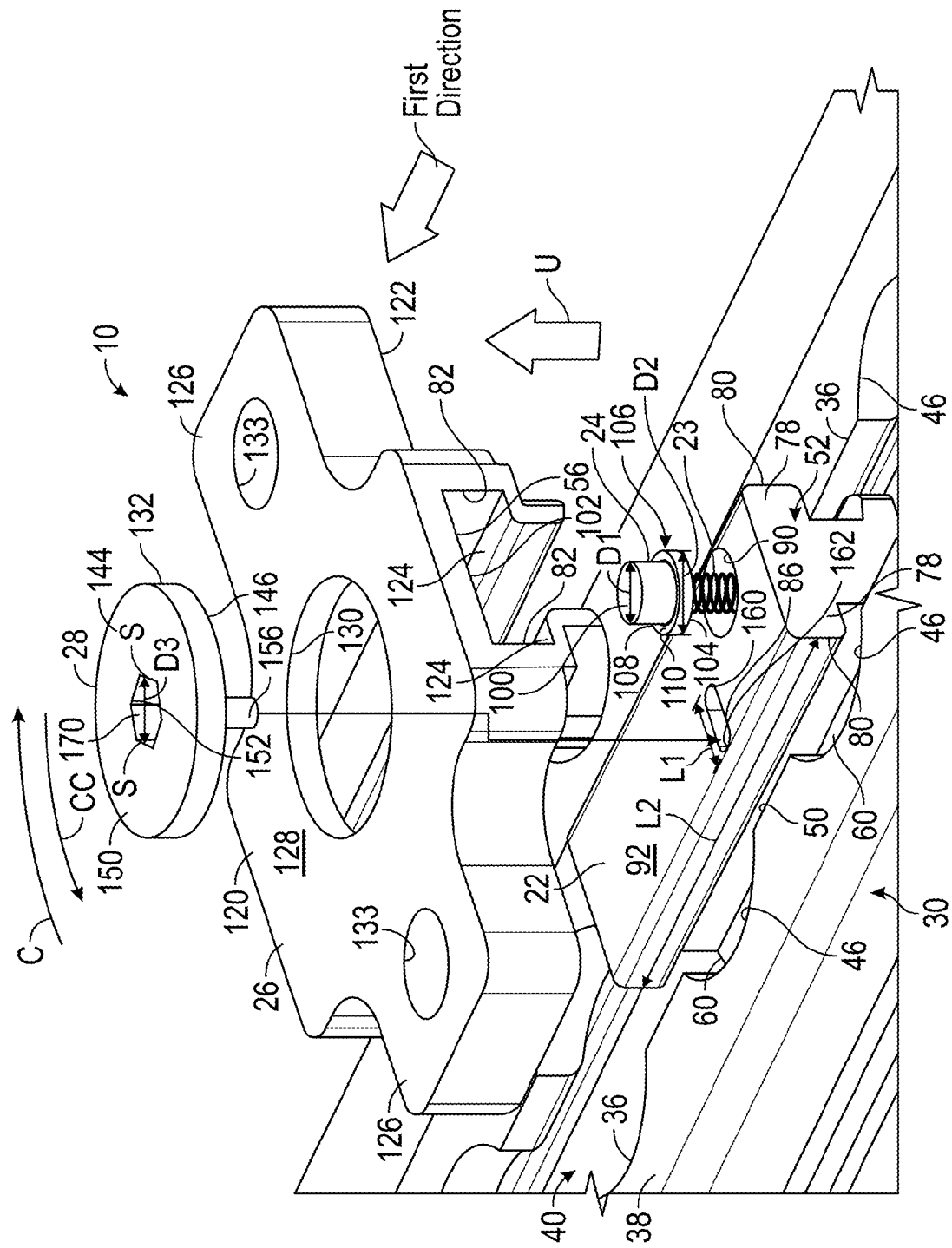
FIG. 3 is an exploded view of the track fitting assembly and the track shown in FIG. 1.
Figure 4:
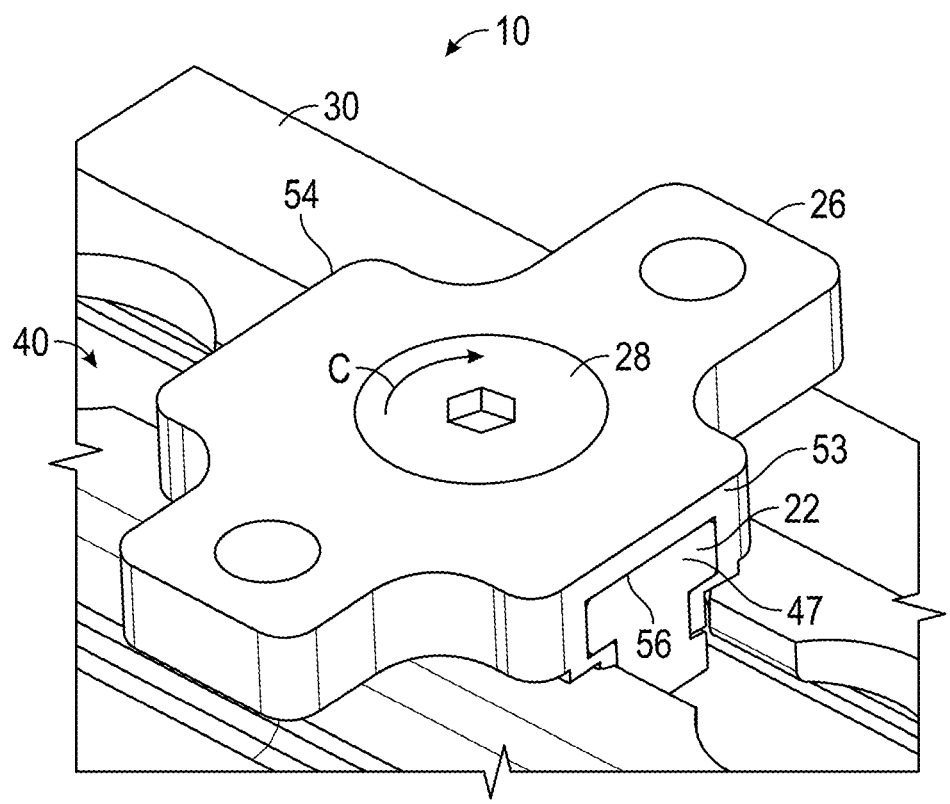
FIG. 4 is an elevated perspective view of the track fitting assembly and the track shown in FIG. 1 in a first, unengaged position.

FIG. 3 is an exploded view of the track fitting assembly 10. In the embodiment as shown, the lower track fitting 22 has been placed within the longitudinal slot 40 of the track 30 in a first, unengaged position. When the lower track fitting 22 is in the unengaged position within the longitudinal slot 40 of the track 30, the head portions 60 of the lower track fitting 22 may be generally aligned with the recesses 46 located along a corresponding edge 36 of the track 30. Similarly, the neck portion 62 of the lower track fitting 22 (seen in FIG. 2) may also be generally aligned with the raised sections 50 located along a corresponding edge 36 of the track 30. Thus, if the track fitting assembly 10 positioned in the unengaged position along the longitudinal slot 40 of the track 30, the lower track fitting 22 may pass through or be removed from the track 30. FIG. 4 is an illustration of the assembled track fitting assembly 10 positioned within the track 30 in the unengaged position.

Figure 5:
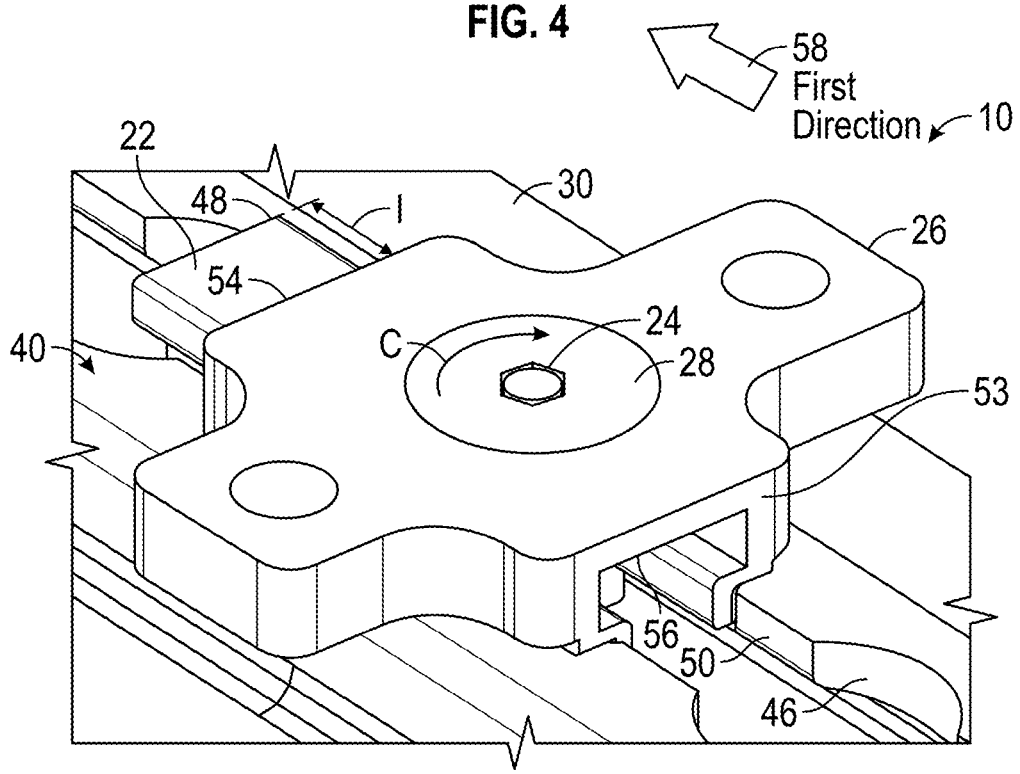
FIG. 5 is an elevated perspective view of the track fitting assembly and the track shown in FIG. 1 in a second, engaged position.

FIG. 5 is an illustration of the track fitting assembly 10 positioned within the track 30 in a second, engaged position. A user may actuate the track fitting assembly 10 from the unengaged position (FIG. 4) to the engaged position by rotating the cam 28 in a clockwise direction C, which is described in greater detail below. Rotation of the cam 28 may cause the lower track fitting 22 to slide within the longitudinal slot 40 of the track 30 and the longitudinal slot 56 of the upper track fitting 26 in a first direction 58, and into the engaged position. Specifically, the lower track fitting 22 may slide within the track 30 and the upper track fitting 26 by an incremental distance I. The incremental distance I may be measured between a rear end face 48 of the lower track fitting 22 and a rear end face 54 of the upper track fitting 26. The rear end face 48 of the lower track fitting 22 and the rear end face 54 of the upper track fitting 26 may both be oriented in a direction that is generally transverse to the first direction 58.

If the track fitting assembly 10 is in the engaged position, the lower track fitting 22 may not pass through the track 30. Referring generally to FIGS. 2-3 and 5, the lower track fitting 22 may not pass through the track 30 in the engaged position because the head portions 60 of the lower track fitting 22 may no longer be generally aligned with the recesses 46 located along a corresponding edge 36 of the track 30. Also, the neck portion 62 of the lower track fitting 22 (seen in FIG. 2) may no longer be generally aligned with the raised sections 50 located along a corresponding edge 36 of the track 30. The head portions 60 of the lower track fitting 22 may not pass through the raised sections 50 located along the edges 36 of the track 30. Thus, the head portions 60 may be used as retaining features to hold the lower track fitting 22 within the track 30 if the track fitting assembly is in the engaged position.

Referring back to FIG. 3, the upper section 52 of the lower track fitting 22 may project above the upper surface 38 of the track 30. The upper section 52 of the lower track fitting 22 may include two generally opposing tongues 78. Each tongue 78 may be located along a longitudinal side 80 of the upper section 52 of the lower track fitting 22. The slot 56 of the upper track fitting 26 may include two corresponding groove sections 82, which may each slidingly receive one of the two tongues 78 of the lower track fitting 22 (the sliding engagement is shown in FIG. 2).

A transverse slot 86 and a recess 90 may each be located along an upper surface 92 of the lower track fitting 22. The transverse slot 86 may include a length L1 measured in a direction transverse to a longitudinal length L2 of the lower track fitting 22. In one embodiment, the recess 90 may be a generally cylindrical opening sized to receive the biasing member 23 and the button 24. Specifically, the biasing member 23 may first be placed within the recess 90, and the button 24 may then be placed above the biasing member 23.

Figure 8:
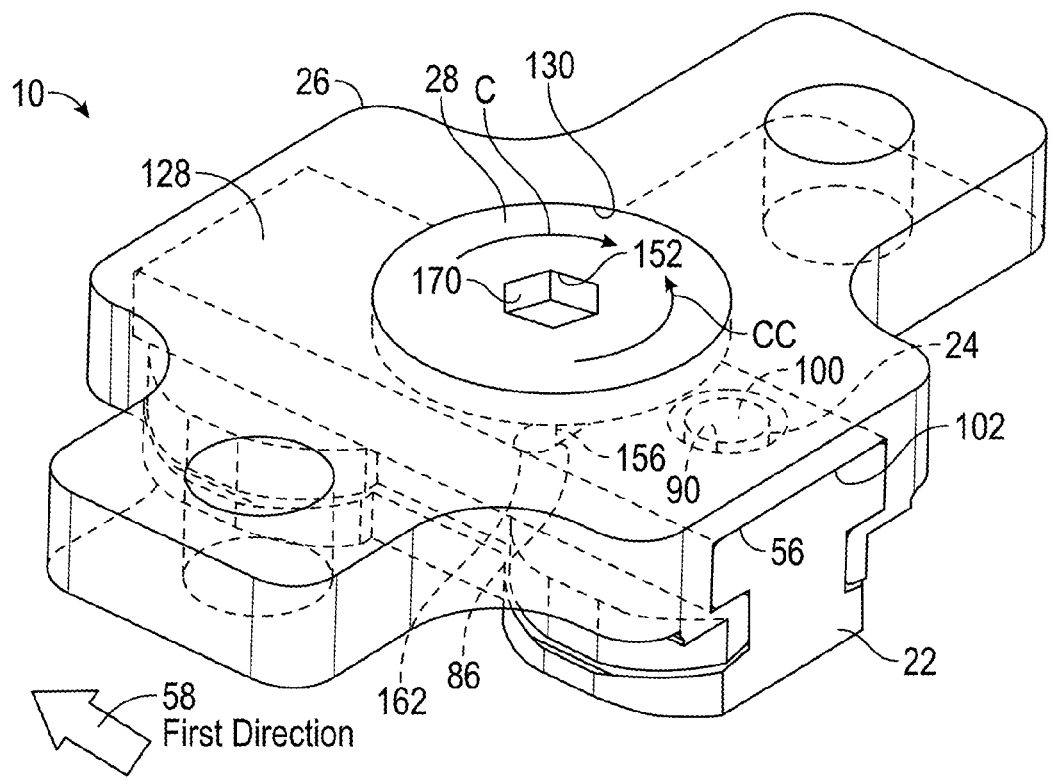
FIG. 8 is an elevated perspective view of the entire track fitting assembly shown in FIG. 1 in the unengaged position.

Referring to FIGS. 3 and 8, when the track fitting assembly 10 is in the unengaged position, an upper or indicator surface 100 of the button 24 may abut against an inner surface 102 of the upper track fitting 26. The biasing member 23 may exert a spring or biasing force against a lower surface 104 of the button 24 (shown in FIG. 3). However, the abutment between the indicator surface 100 of the button 24 and the inner surface 102 of the upper track fitting 26 retains both the biasing member 23 and the button 24 within the recess 90 of the lower track fitting 22. The biasing force exerted by the biasing member 23 may be directed in an upwards direction U, towards the inner surface 102 of the upper track fitting 26. The biasing member 23 is illustrated as a compression spring, however it is to be understood that any type device configured to exert a biasing force against the button 24 may be used as well.

Referring to FIG. 3, the button 24 may include a generally cylindrical body with a first diameter D1, as well as an enlarged bottom end 106. The bottom end 106 of the button 24 may include a step 108, an engagement surface 110, and a second diameter D2. The first diameter D1 of the button 24 may be less than the second diameter D2 of the bottom end 106. In one embodiment, the indicator surface 100 of the button 24 may include any type of marking or coloration that clearly distinguishes the indicator surface 100 from the remaining surfaces of the track fitting assembly 10. For example, in one embodiment the indicator may be paint of any color, or a phosphorescent paint. The indicator may be used to provide a visible indication of whether the track fitting assembly 10 is in the engaged position, and is described in greater detail below.

The cam 28 may also include an indicator surface 170 inside of a key aperture 152 of the cam 28 as well. Similar to the indicator surface 100 of the button 24, the indicator surface 170 located inside of the key aperture 152 may also include any type of marking or coloration that clearly distinguishes the indicator surface 170 from the remaining surfaces of the track fitting assembly 10. The indicator surface 170 may be used to provide a visible indication that the track fitting assembly 10 is in the disengaged position. In one non-limiting embodiment, the indicator surface 170 of the key aperture 152 may be painted red for certification reasons.

The upper track fitting 26 may include an upper surface 120, a lower surface 122, two sliding surfaces 124, two generally opposing flanges 126, and a main body 128. The main body 128 may define a generally circular aperture 130, which corresponds with an outer perimeter 132 of the cam 28. Thus, as seen in FIGS. 5 and 8, the aperture 130 located in the main body 128 of the upper track fitting 26 may receive the cam 28. The cam 28 may be selectively rotatable within the aperture 130 of the upper track fitting 26. Turning back to FIG. 3, the two flanges 126 may each include a corresponding bolt hole 133. The bolt holes 133 may be used to secure a structure (not shown) to the track fitting assembly 10. As mentioned above, the structure may be any device such as, for example, a passenger seat or a monument for an aircraft.

Figure 6:
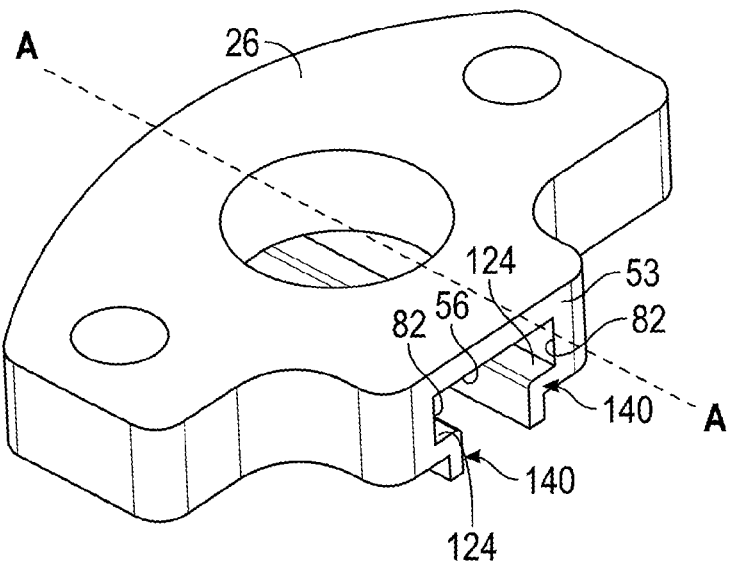
FIG. 6 is an elevated perspective view of a portion of the upper track fitting shown in FIG. 1.
Figure 7:
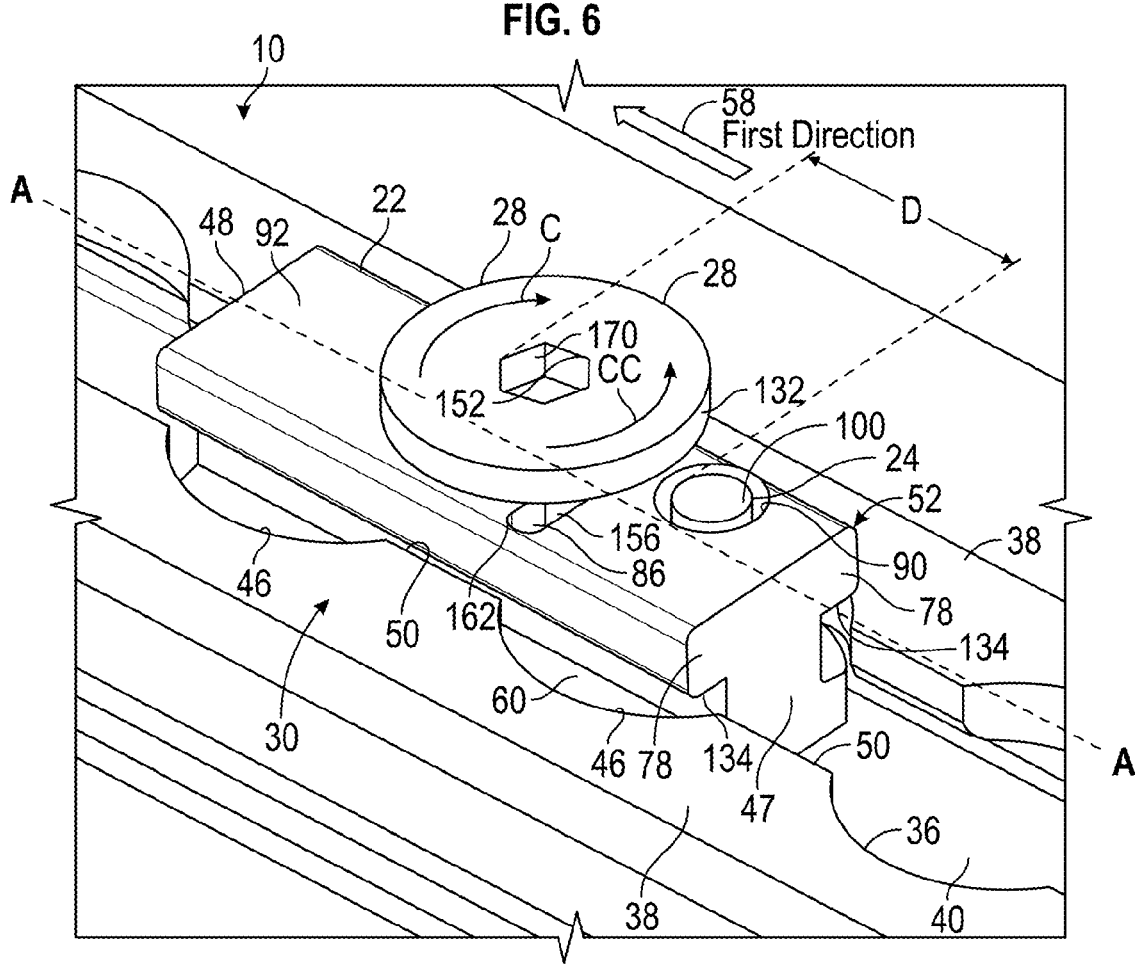
FIG. 7 is an elevated perspective view of a portion of the track fitting assembly shown in FIG. 1 in the unengaged position.

Referring to FIGS. 6 and 7, the two sliding surfaces 124 of the upper track fitting 26 may each be located along a bottom end 140 of one of the groove sections 82 within the slot 56. When the upper section 52 of the lower track fitting 22 is slidingly engaged with the longitudinal slot 56 of the upper track fitting 26 (the engagement is shown in FIGS. 4-5), the two sliding surfaces 124 of the upper track fitting 26 may abut and slide against two sliding surfaces 134 located along each tongue 78 of the lower track fitting 22 (shown in FIG. 7). In one embodiment, the two sliding surfaces 124 may include a generally ramped profile. Referring to FIGS. 4-6, the lower track fitting 22 includes a front end face 47 and the rear end face 48, and the upper track fitting 26 includes a front end face 53 and the rear end face 54. The two sliding surfaces 124 of the upper track fitting 26 may each be sloped or ramped in the longitudinal direction. Specifically, the two sliding surfaces 124 may be ramped between the front end face 53 and the rear end face 54 of the upper track fitting 26 along a longitudinal axis A-A. For example, in one embodiment the two sliding surfaces 124 may include a ramp or slope of about five degrees between the front end face 53 and the rear end face 54 of the upper track fitting 26.

Referring to FIG. 7, the two sliding surfaces 134 located on each tongue 78 of the lower track fitting 22 may also be ramped in a direction that generally corresponds with the two sliding surfaces 124 of the upper track fitting 26. Specifically, the two sliding surfaces 134 may be ramped between the front end face 47 and the rear end face 48 of the lower track fitting 22 along the longitudinal axis A-A as well. For example, in one embodiment the two sliding surfaces 134 may include a ramp of about five degrees between the front end face 47 and the rear end face 48 of the lower track fitting 22. Referring to FIGS. 4-7, when the track fitting assembly 10 is positioned within the longitudinal slot 40 of the track 30 in either the engaged or the disengaged position, the abutment between the sliding surfaces 124 of the upper track fitting 26 and the two sliding surfaces 134 of the lower track fitting 22 may create a clamping force between the upper track fitting 26 and the lower track fitting 22. The clamping force may reduce or substantially eliminate rattle between the upper track fitting 26, the lower track fitting 22, and the track 30.

Referring back to FIG. 3, the cam 28 may include the outer perimeter 132, an upper surface 144, a lower surface 146, and a main body 150. The key aperture 152 may be centrally located within the main body 150 of the cam 28, and may extend between the upper surface 144 and the lower surface 146 of the main body 150 of the cam 28. In the exemplary embodiment as shown in FIG. 3, the key aperture 152 may include a generally hexagonal profile, however it is to be understood that the key aperture 152 may include other profiles as well. The key aperture 152 may be configured to receive and matingly engage with a cross-section of a hex key (not shown). Thus, a user may insert the hex key into the key aperture 152 to rotate the cam 28 within the aperture 130 of the upper track fitting 26, which is described in greater detail below. Although a hex key is described, it is to be understood that any other key member or tool having a cross-section that generally corresponds with the key aperture 152 may be used as well.

The key aperture 152 may also include a hexagonal diameter D3. The hexagonal diameter D3 may be measured between two opposing sides S of the key aperture 152. The hexagonal diameter D3 may be greater than the first diameter D1 of the button 24, but also less than the second diameter D2 of the bottom end 106 of the button 24. Thus, a portion of the button 24 may protrude through the key aperture 152 when the track fitting assembly 10 is actuated into the second, engaged position (shown in FIGS. 5 and 9). However, the bottom end 106 of the button 24 may not pass through the key aperture 152. Instead, the engagement surface 110 of the bottom end 106 of the button 24 may abut against the lower surface 146 of the cam 28.

Continuing to refer to FIG. 3, the lower surface 146 of the cam 28 may include a boss 156 that projects outwardly away from the lower surface 146 of the cam 28. The boss 156 may be sized to slide back and forth along the length L1 of the transverse slot 86 of the lower track fitting 22. Turning now to FIG. 7, an illustration of the track fitting assembly 10 placed in the unengaged position within the track 30 is shown, where the upper track fitting 26 has been omitted in order to more clearly show the upper surface 92 of the lower track fitting 22. The boss 156 of the cam 28 may abut against a first end 160 of the transverse slot 86 (the first end 160 is seen in FIG. 3) when the track fitting assembly 10 is in the unengaged position.

Referring to both FIGS. 3 and 7, a user may rotate the cam 28 within the aperture 130 of the upper track fitting 26 in the clockwise direction C in order to actuate the track fitting assembly 10 from the unengaged position into the engaged position. Specifically, rotation of the cam 28 in the clockwise direction C causes the boss 156 of the cam 28 to travel from the first end 160 of the transverse slot 86 and towards a second end 162 of the transverse slot 86, and back towards the first end 160 of the transverse slot 86. The rotation of the cam 28 in the clockwise direction C may also urge the lower track fitting 22 to slide in first direction 58.

Referring specifically to FIG. 7, when the track fitting assembly 10 is in the unengaged position, the button 24 may be generally aligned with the key aperture 152 of the cam 28 in the longitudinal direction. Moreover, the button 24 may also be positioned at a predetermined longitudinal distance D from the key aperture 152. The indicator surface 170 located inside of the key aperture 152 may be visible to a user.

Turning now to FIG. 8, an illustration of the entire track fitting assembly 10 is shown in the unengaged position. The upper track fitting 26 has been illustrated in FIG. 8 as a transparent component in order to reveal the transverse slot 86 located within the lower track fitting 22, as well as the button 24 located within the recess 90 of the lower track fitting 22. When the track fitting assembly 10 is in the unengaged position, the indicator surface 100 of the button 24 may abut against the inner surface 102 of the upper track fitting 26, and may not be visible to a user.

In one embodiment, a user may insert a hex key (not shown) into the key aperture 152. The user may rotate the hex key in the clockwise direction C, which in turn also rotates the cam 28 in the clockwise direction C. Specifically, a user may rotate the cam 28 within the aperture 130 of the upper track fitting 26 by a predetermined amount, which in turn may actuate the track fitting assembly 10 from the unengaged position into the engaged position (shown in FIG. 9). In one exemplary embodiment, the predetermined amount of rotation of the cam 28 may be about ninety degrees.

Referring to both FIGS. 3 and 8, the cam 28 may rotate in the clockwise direction C while the boss 156 of the cam 28 travels twice the length L1 of the transverse slot 86 of the lower track fitting 22. Specifically, the boss of the cam 28 may first travel from the first end 160 towards the second end 162 of the transverse slot 86, and back towards the first end 160 of the transverse slot 86. The boss 156 of the cam 28 may then abut against the first end 160 of the transverse slot 86 in the lower track fitting 22. The abutment between the boss 156 of the cam 28 and the first end 160 of the transverse slot 86 in the lower track fitting 22 may prevent further rotation of the cam 28 in the clockwise direction. Moreover, the track fitting assembly 10 may be in the engaged position as shown in FIG. 9 once the boss 156 of the cam 28 abuts against the first end 160 of the transverse slot 86 in the lower track fitting 22.

Figure 9:
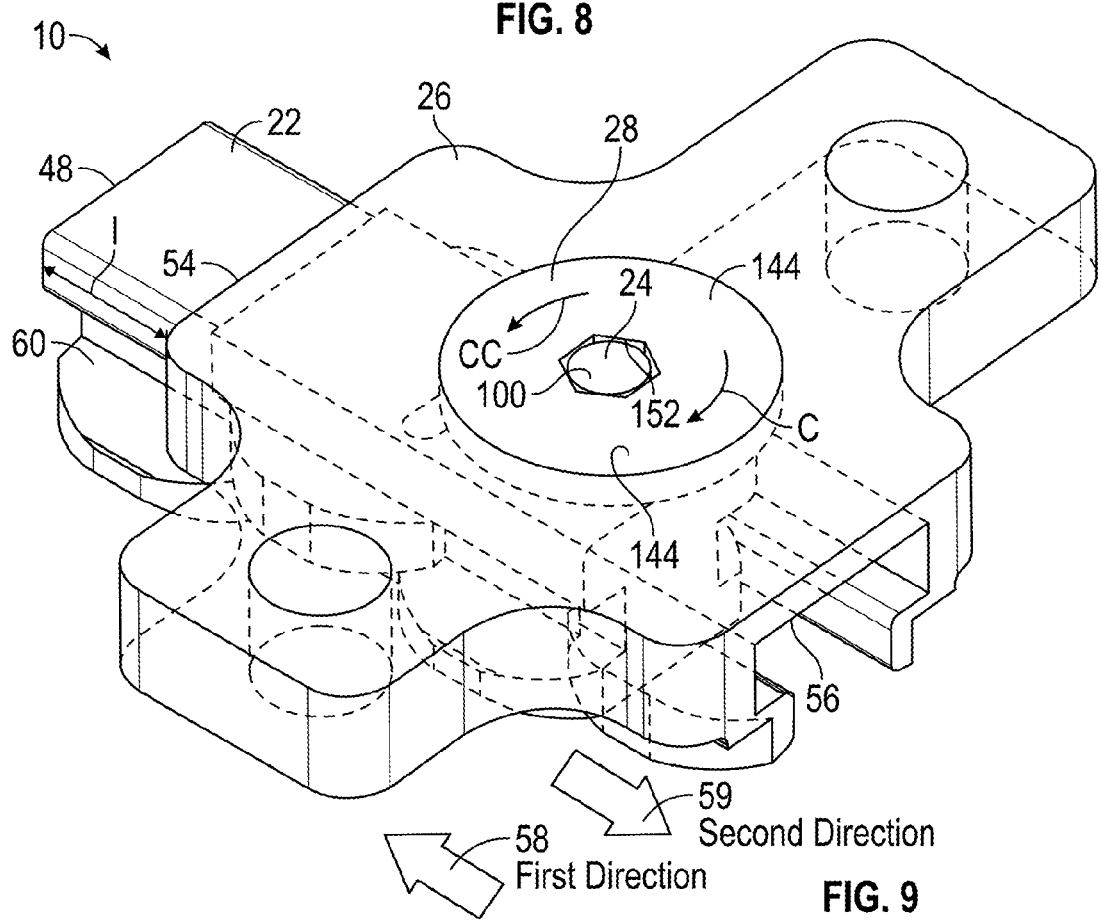
FIG. 9 is an elevated perspective view of the entire track fitting assembly shown in FIG. 1 in the engaged position.

FIG. 9 is an illustration of the track fitting assembly 10 in the engaged position, where the upper track fitting has been illustrated as a transparent component. The button 24 may be received by the key aperture 152 of the cam 28. The engagement of the button 24 within the key aperture 152 of the cam 28 may lock the track fitting assembly 10 in the engaged position. When the track fitting assembly 10 is in the engaged position, the lower track fitting 22 has been moved by the incremental distance I in the first direction 58 relative to the upper track fitting 26 and the track 30 (the track 30 is shown in FIGS. 1, 3, 4-5 and 7). Also, when the track fitting assembly 10 is in the engaged position the indicator surface 170 located inside of the key aperture 152 (shown in FIGS. 7-8) may no longer be visible. Instead, the indicator surface 100 of the button 24 may now be visible to a user, and provides an indication that the track fitting assembly 10 is in the engaged position.

Referring to both FIGS. 3 and 9, when the track fitting assembly 10 is in the engaged position at least a portion of the button 24 may no longer be retained within the recess 90 of the lower track fitting 22. Instead, the biasing member 23 may exert the biasing force against the lower surface 104 of the button 24 to urge at least a portion of the button 24 out of the recess 90 of the lower track fitting 22, and through the key aperture 152 of the cam 28 such that the indicator surface 100 is visible to a user. In one embodiment, the indicator surface 100 of the button 24 may be flush or generally aligned with the upper surface 144 of the cam 28. The engagement surface 110 of the bottom end 106 of the button 24 (FIG. 3) may abut against the lower surface 146 of the cam 28. The engagement between the bottom end 106 of the button 24 and the lower surface 146 of the cam 28 may retain the button 24 within the key aperture 152 of the cam 28. Thus, the biasing force exerted by the biasing member 23 may not urge the button 24 out of the key aperture 152 of the cam 28.

In order to actuate the track fitting assembly 10 back into the unengaged position (shown in FIG. 8), a user may place the hex key (not shown) back into the key aperture 152 of the cam 28. The hex key may urge or push the button 24 downwardly, and back into the recess 90 located along the upper surface 92 of the lower track fitting 22 (shown in FIG. 3). A user may then rotate the hex key and the cam 28 in the counterclockwise direction CC. Rotation of the cam 28 in the counterclockwise direction CC may cause the lower track fitting 22 to slide within the longitudinal slot 40 of the track 30 (FIG. 1) and the longitudinal slot 56 of the upper track fitting 26 in a second direction 59. The second direction 59 generally opposes the first direction 58.

Figure 10:
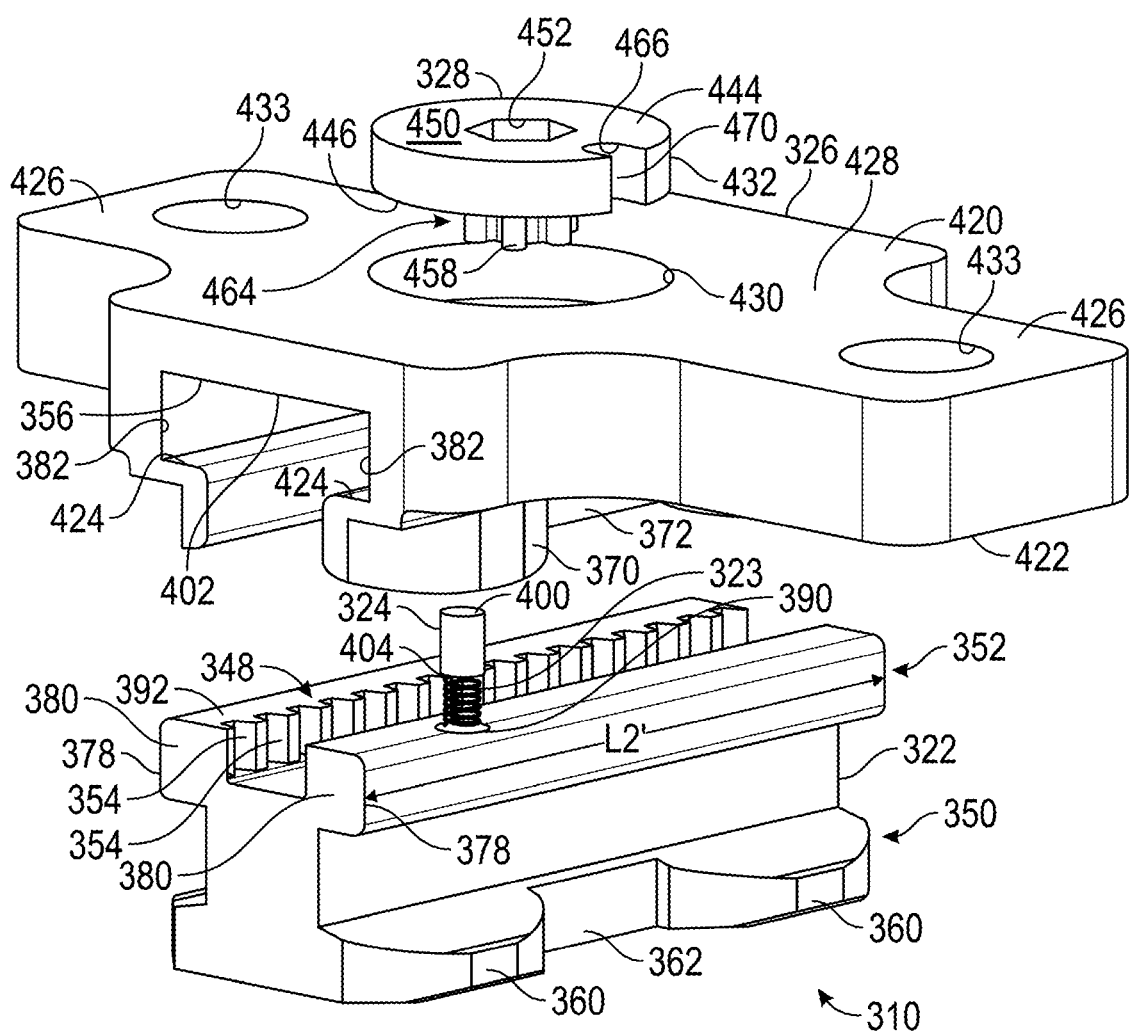
FIG. 10 is an exploded view of an alternative embodiment of the track fitting assembly shown in FIG. 1.

FIG. 10 is an alternative embodiment of a track fitting assembly 310. The track fitting assembly 310 may include a lower track fitting 322, a biasing member 323, a button 324, an upper track fitting 326, and a cam 328. Similar to the embodiment as described above and shown in FIGS. 1-9, the track fitting assembly 310 may also be used for securing a structure (not shown) to the track 30 (shown in FIG. 1). The lower track fitting 322 may include a bottom section 350 and a upper section 352. The bottom section 350 of the lower track fitting 322 may be selectively received by the longitudinal slot 40 in the track 30 (shown in FIG. 1). The upper section 352 of the lower track fitting 322 may be slidingly engaged with a corresponding longitudinal slot 356 located within the upper track fitting 326. The bottom section 350 of the lower track fitting 322 may include at least one head portion 360 and at least one neck portion 362. The upper track fitting 326 may also include at least one head portion 370 and at least one neck portion 372.

Figure 12:
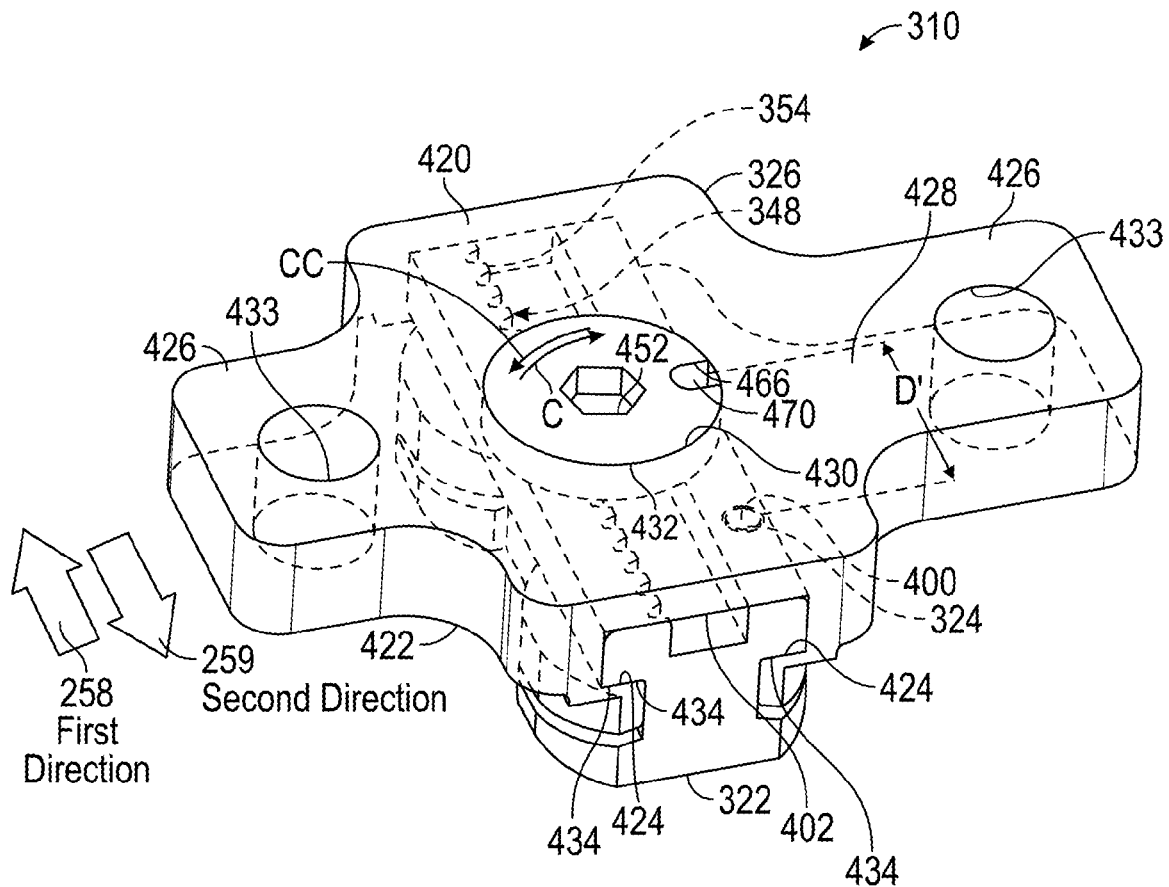
FIG. 12 is an elevated perspective view of the track fitting assembly shown in FIG. 10 in the unengaged position.

The lower track fitting 322 may also include two tongues 378. Each tongue 378 may be located along a longitudinal side 380 of the upper section 352 of the lower track fitting 322. The slot 356 located within the upper track fitting 326 may include two corresponding groove sections 382, which each slidingly receive one of the two tongues 378 of the lower track fitting 322. The sliding engagement between the two groove sections 382 of the upper track fitting 326 and the two tongues 378 of the lower track fitting 322 is shown in FIG. 12.

Referring to FIG. 10, the upper section 352 of the lower track fitting 322 may include an upper surface 392 and a rack 348. The rack 348 may be located along one of the longitudinal sides 380 of the upper section 352 of the lower track fitting 322. The rack 348 may extend along at least a portion of a longitudinal length L2' of the lower track fitting 322. In the exemplary embodiment as shown in FIG. 10, the rack 348 extends along the entire longitudinal length L2' of the lower track fitting 322. The rack 348 may include a series of teeth 354. The teeth 354 may be configured to meshingly engage with a set of corresponding teeth 458 located on the cam 328.

Figure 11:
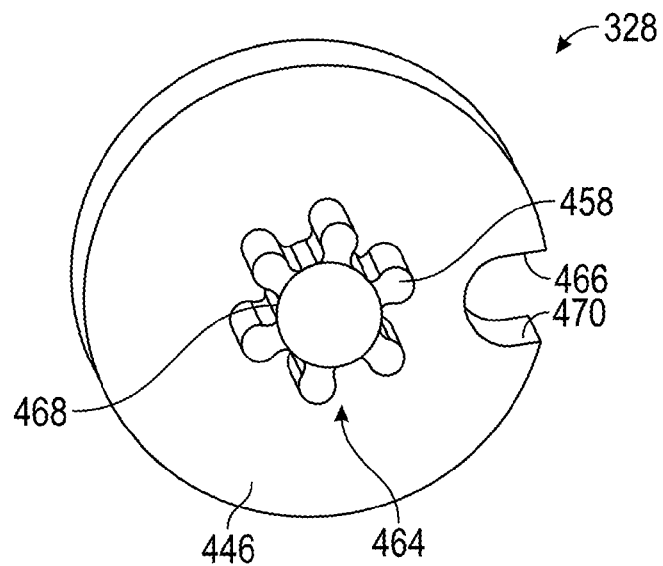
FIG. 11 is a bottom view of a cam shown in FIG. 10.

The cam 328 may include an outer perimeter 432, an upper surface 444, a lower surface 446, a main body 450, a key recess 452, a pinion portion 464, and an aperture 466. The key recess 452 may extend through the upper surface 444 of the main body 450 of the cam 328, but not through the lower surface 446 of the main body 450 of the cam 328. In the exemplary embodiment as shown in FIG. 10, the key aperture 152 may include a hexagonal profile, which may be configured to engage with a hex key (not shown). The aperture 466 of the cam 328 may be located along the outer perimeter 432 of the cam 328, and may extend through both the upper surface 444 and the lower surface 446 of the main body 450 of the cam 328. The aperture 466 of the cam 328 may be sized to selectively receive the button 324. Referring to FIG. 11, the pinion portion 464 of the cam 328 may be located along the lower surface 446 of the cam 328. The pinion portion 464 may be generally cylindrical in shape, and the teeth 458 may be located around an outer circumference 468 of the pinion portion 464.

Referring back to FIG. 10, a recess 390 may be disposed along the upper surface 392 of the lower track fitting 322. Specifically, the recess 390 may be positioned along one of the longitudinal sides 380 of the upper section 352 of the lower track fitting 322. In the embodiment as shown, the recess 390 may be positioned along the longitudinal side of the upper section 352 of the lower track fitting 322 that does not include the rack 348. In one embodiment, the recess 390 may be a generally cylindrical opening sized to receive the biasing member 323 and the button 324. The biasing member 323 may first be placed within the recess 390, and the button 324 may then be placed above the biasing member 323.

FIG. 12 is an illustration of the track fitting assembly 310 in the unengaged position. The button 324 may be generally aligned with the aperture 466 of the cam 328 in the longitudinal direction, where the button 324 may be positioned at a longitudinal distance D' from the aperture 466. Referring to both FIGS. 10 and 12, when the track fitting assembly 310 is in the unengaged position, an indicator surface 400 of the button 324 may abut against an inner surface 402 of the upper track fitting 326. The biasing member 323 may exert a biasing force against a lower surface 404 of the button 324 (shown in FIG. 10). However, the abutment between the indicator surface 400 of the button 324 and the inner surface 402 of the upper track fitting 326 retains both the biasing member 323 and the button 324 within the recess 390 of the lower track fitting 322.

Similar to the embodiment as described above and shown in FIGS. 1-9, the indicator surface 400 of the button 324 may include any type of marking or coloration that clearly distinguishes the indicator surface 400 of the button 324 from the remaining portions of the track fitting assembly 310. It should be noted that the button 324 may include an enlarged bottom end, similar to the bottom end 106 of the button 24 shown in FIG. 3. Moreover, similar to the embodiment as shown in FIGS. 1-9, the cam 328 may also include an indicator surface 470 inside of the recess 466 as well. The indicator surface 470 may also include any type of marking or coloration that clearly distinguishes the indicator surface 470 from the remaining surfaces of the track fitting assembly 310.

Referring to both FIGS. 10 and 12, the upper track fitting 326 may include an upper surface 420, a lower surface 422, two sliding surfaces 424, two generally opposing flanges 426, and a main body 428. The main body 428 may define a generally circular aperture 430, which may correspond with the outer perimeter 432 of the cam 328. Thus, as seen in FIG. 12, the aperture 430 located in the main body 428 of the upper track fitting 236 may receive the cam 328. The cam 328 may be selectively rotatable within the aperture 430 of the upper track fitting 326. The two flanges 426 may each include a corresponding bolt hole 433. The bolt holes 433 may be used to secure a structure (not shown) to the track fitting assembly 310. Similar to the embodiment as shown in FIGS. 1-9, the two sliding surfaces 424 of the upper track fitting 326 and two sliding surfaces 434 of the lower track fitting 322 may both include a generally ramped profile. Specifically, the two sliding surfaces 434 of the lower track fitting 322 may be ramped in a direction that generally corresponds with the two sliding surfaces 424 of the upper track fitting 326, and has been described in detail above and illustrated in FIG. 6.

Referring to FIGS. 11 and 12, the teeth 354 located on the rack 348 of the lower track fitting 322 may meshingly engage with the teeth 458 located on the pinion portion 464 of the cam 328 (shown in FIG. 11), which creates a rack and pinion type engagement between the lower track fitting 322 and the cam 328. Thus, as a user rotates the cam 328 within the aperture 430 of the upper track fitting 326 in the clockwise direction C, the rack and pinion type engagement between the lower track fitting 322 and the cam 328 may translate the rotational motion of the cam 328 into linear motion of the lower track fitting 322. Specifically, the rotation of the cam 328 in the clockwise direction C may be translated into linear motion of the lower track fitting 322 in a first direction 258. Similarly, rotation of the cam 328 in the counterclockwise direction CC may be translated into linear motion of the lower track fitting 322 in a second direction 259.

Similar to the embodiment as described above and shown in FIGS. 1-9, a user may insert a hex key (not shown) into the key recess 452 of the cam 328. The user may rotate the hex key in the clockwise direction C by the predetermined amount, which in turn rotates the cam 328 in the clockwise direction C by the predetermined amount within the aperture 430 of the upper track fitting 326, and into the engaged position (shown in FIG. 13). In the exemplary embodiment as shown in FIGS. 10-13, the predetermined amount of rotation of the cam 328 may be about three hundred and sixty degrees.

Figure 13:
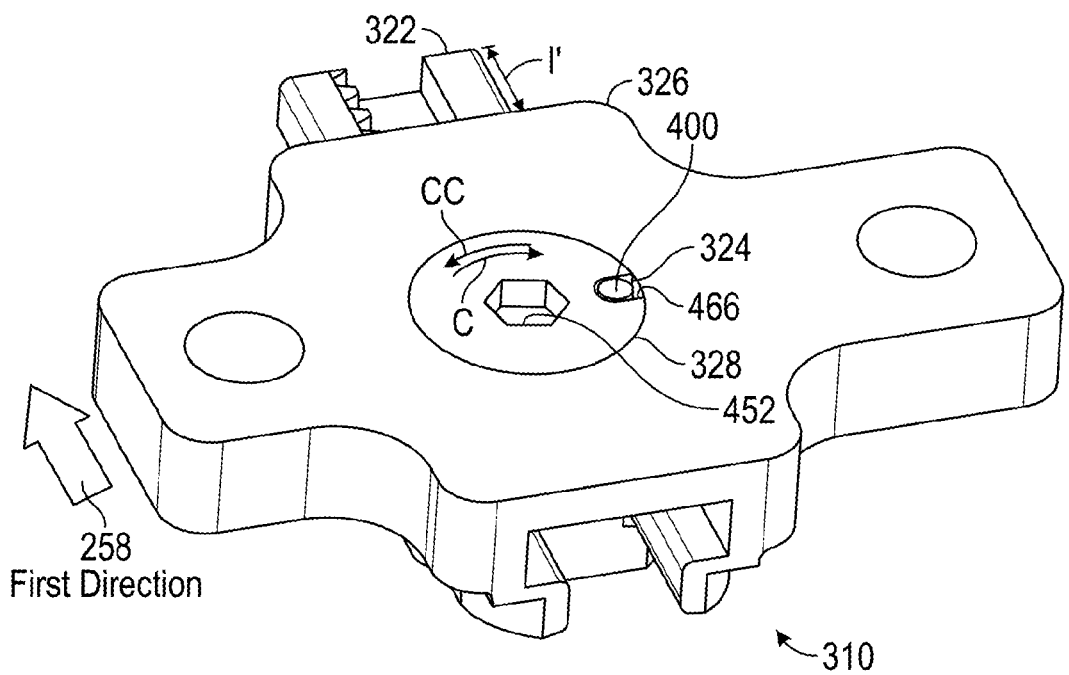
FIG. 13 is an elevated perspective view of the track fitting assembly shown in FIG. 10 in the second, engaged position.

Turning now to FIG. 13, when the track fitting assembly 310 is in the engaged position the button 324 may be received by the aperture 466 of the cam 328. Moreover, the lower track fitting 322 may be moved by an incremental distance I' in the first direction relative to the upper track fitting 326 and the track 30 (the track 30 is shown in FIGS. 1, 3, 4-5 and 7). Additionally, the indicator surface 470 located inside of the aperture 466 (shown in FIGS. 10-12) may no longer be visible when the track fitting assembly 310 is in the engaged position. Instead, the indicator surface 400 of the button 324 may now be visible to a user. Similar to the embodiment as shown in FIGS. 1-9, a hex key (not shown) may be placed into the key recess 452 of the cam 328 in order to actuate the track fitting assembly 10 back into the unengaged position. The hex key may urge or push the button 324 downwardly, and back into the recess 390 located along the upper surface 392 of the lower track fitting 322 (shown in FIG. 10). A user may then rotate the hex key and the cam 328 in a counterclockwise direction CC.

Figure 14:
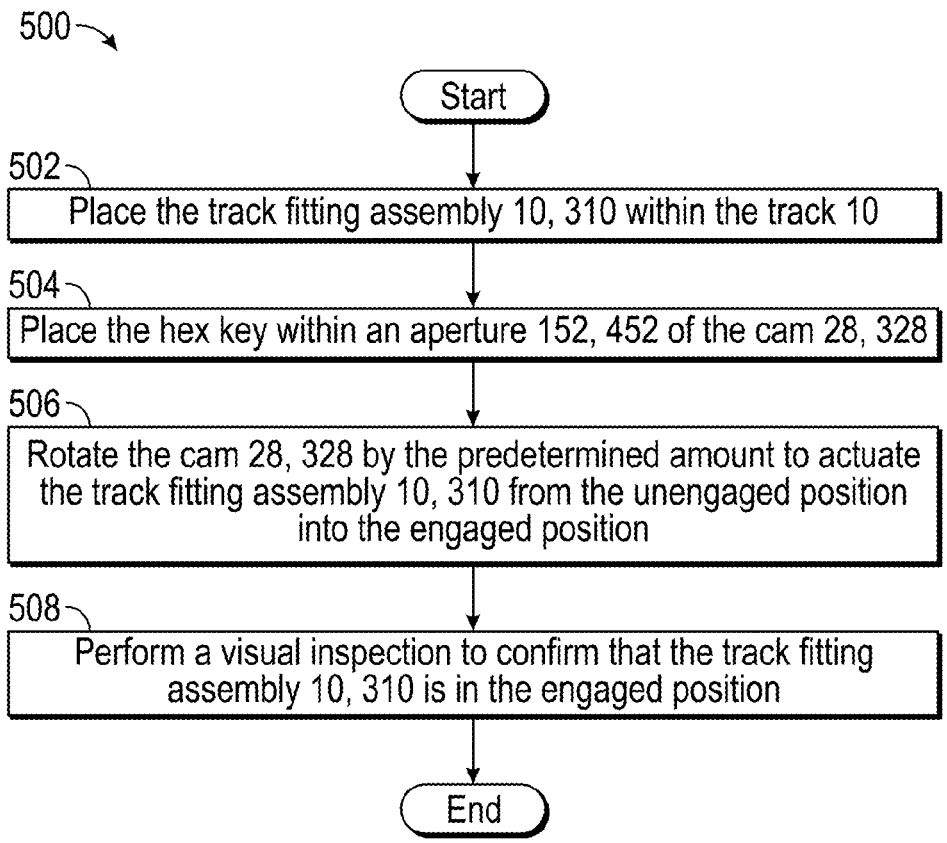
FIG. 14 is an exemplary process flow diagram illustrating a method of actuating the disclosed track fitting assemblies from the unengaged position to the engaged position.

FIG. 14 is a process flow diagram illustrating an exemplary method 500 for actuating either the track fitting assembly 10 as shown in FIGS. 1-9 or the track fitting assembly 310 as shown in FIGS. 10-13 from the unengaged position to the engaged position. Referring generally to FIGS. 1-14, method 500 may begin at block 502, where the track fitting assembly 10, 310 may be placed within the longitudinal slot 40 of the track 30 in the unengaged position. Method 500 may then proceed to block 504.

In block 504, a user may place a hex key (not illustrated) in the key aperture 152 of the cam 28 (FIGS. 1-9), or the key recess 452 of the cam 328 (FIGS. 10-13). Method 500 may then proceed to block 506.

In block 506, the cam 28, 328 may be rotated by the predetermined amount. For example, in the embodiment as shown in FIGS. 1-9, the predetermined amount of rotation may be about ninety degrees. In the embodiment as shown in FIGS. 10-13, the predetermined amount of rotation may be about three hundred and sixty degrees. Method 500 may then proceed to block 508.

In block 508, a user may perform a visual inspection to confirm that the track fitting assembly 10, 310 is in the engaged position. For example, in the embodiments as shown in FIGS. 1-9, when the track fitting assembly 10 is in the engaged position, the indicator surface 100 of the button 24 may be viewed through the key aperture 152 of the cam 28. Similarly, in the embodiments as shown in FIGS. 10-13, when the track fitting assembly 310 is in the engaged position, the indicator surface 400 of the button 324 may be viewed through the aperture 466 of the cam 328. Method 500 may then terminate.

Referring generally to FIGS. 1-14, in one embodiment a user may actuate the disclosed track fitting assembly 10 (illustrated in FIGS. 1-9) from the unengaged position to the engaged position using only one hand, which may make the track fitting assembly 10 especially attractive in some types applications. In contrast, the track fitting assembly 310 may be beneficial in applications where a driving mechanism with enhanced robustness is needed (i.e., the rack and pinion type engagement between the lower track fitting 322 and the cam 328).

Both of the disclosed track fitting assemblies 10, 310 may provide a more ergonomic and less time-consuming approach to install a monument to the track 30 when compared to some types of track fitting assemblies available today. This is because some other track fitting assemblies currently available may require two individuals to install the monument to the track. Specifically, a first individual may install the track fitting to the track and a second individual, who may be referred to as a witness, confirms the installation was performed correctly. However, the first individual has to wait for the witness to arrive and confirm that the track fittings are correctly installed before the monument may be secured to the track. In contrast, the disclosed track fitting assemblies 10, 310 include a visible indicator that may allow a user to quickly and easily confirm that the track fitting assembly is in the engaged position within the track 30.

Additionally, it may also be challenging to position the monument in place and engage the track fittings with the track using the mechanisms that are currently available. There is typically very limited space between the track and the monument, and it may be difficult to view the track fittings to confirm engagement with the track. However, the disclosed track fitting assemblies 10, 310 may be easily viewed through a window or opening located within the monument (not illustrated). Thus, a user may be able to easily determine if the disclosed track fitting assemblies 10, 310 are in the engaged or unengaged position by simply checking to see if the indicator surface 100, 400 of the button 24, 324 is visible.

While the forms of apparatus and methods herein described constitute preferred embodiments of this disclosure, it is to be understood that the disclosure is not limited to these precise forms of apparatus and methods, and the changes may be made therein without departing from the scope of the disclosure.

What is claimed is:

1. A track fitting assembly having an engaged position and an unengaged position, comprising:
   a lower track fitting defining a recess therein and at least one retaining feature, wherein the at least one retaining feature is configured to hold the lower track fitting within a track if the track fitting assembly is in the engaged position;
   a cam member having a cam main body that defines an aperture;
   a button having an indicator surface, wherein the button is selectively retained within the recess of the lower track fitting, wherein the button is retained within the recess of the lower track fitting and is not visible if the track fitting assembly is in the unengaged position; and
   a biasing member configured to exert a biasing force, wherein the biasing member is retained within the recess of the lower track fitting and positioned relative to the button to exert the biasing force against the button, and wherein the biasing force urges the button through the aperture of the cam member such that the indicator surface of the button is visible through the aperture of the cam member if the track fitting assembly is in the engaged position.

2. The track fitting assembly of claim 1, further comprising an upper track fitting having a longitudinal slot, wherein the lower track fitting is slidingly engaged with the longitudinal slot of the upper track fitting.

3. The track fitting assembly of claim 2, wherein the upper track fitting includes a main body that defines a second aperture, and wherein the cam member is rotatable within the second aperture of the upper track fitting.

4. The track fitting assembly of claim 2, wherein the upper track fitting includes two sliding surfaces that are each located along a bottom portion of the longitudinal slot, and wherein the two sliding surfaces include a generally ramped profile.

5. The track fitting assembly of claim 1, wherein the aperture of the cam member is configured to receive a key member.

6. The track fitting assembly of claim 1, wherein the aperture of the cam member includes a generally hexagonal profile.

7. The track fitting assembly of claim 1, wherein the cam member includes a second indicator surface that is visible if the track fitting assembly is in the unengaged position.

8. The track fitting assembly of claim 1, wherein the at least one retaining feature of the lower track fitting is at least one head portion including a generally rounded profile.

9. A track fitting assembly having an engaged position and an unengaged position, comprising:
- a lower track fitting defining a recess therein and at least one retaining feature, wherein the at least one retaining feature is configured to hold the lower track fitting within a track if the track fitting assembly is in the engaged position;
- a cam member having a cam main body that defines an aperture;
- a button having an indicator surface, wherein the button is selectively retained within the recess of the lower track fitting;
- a biasing member configured to exert a biasing force, wherein the biasing member is retained within the recess of the lower track fitting and positioned relative to the button to exert the biasing force against the button, and wherein the biasing force urges the button through the aperture of the cam member such that the indicator surface of the button is visible through the aperture of the cam member if the track fitting assembly is in the engaged position; and
- an upper track fitting having a longitudinal slot, wherein the lower track fitting is slidingly engaged with the longitudinal slot of the upper track fitting.

10. The track fitting assembly of claim 9, wherein the upper track fitting includes a main body that defines a second aperture, and wherein the cam member is rotatable within the second aperture of the upper track fitting.

11. The track fitting assembly of claim 9, wherein the upper track fitting includes two sliding surfaces that are each located along a bottom portion of the longitudinal slot, and wherein the two sliding surfaces include a generally ramped profile.

12. The track fitting assembly of claim 9, wherein the aperture of the cam member is configured to receive a key member.

13. The track fitting assembly of claim 9, wherein the aperture of the cam member includes a generally hexagonal profile.

14. The track fitting assembly of claim 9, wherein the cam member includes a second indicator surface that is visible if the track fitting assembly is in the unengaged position.

15. The track fitting assembly of claim 9, wherein the at least one retaining feature of the lower track fitting is at least one head portion including a generally rounded profile.

16. A track fitting assembly having an engaged position and an unengaged position, comprising:
- a lower track fitting defining a recess therein and at least one retaining feature, wherein the at least one retaining feature is configured to hold the lower track fitting within a track if the track fitting assembly is in the engaged position;
- a cam member having a cam main body that defines an aperture;
- a button having an indicator surface, wherein the button is selectively retained within the recess of the lower track fitting; and
- a biasing member configured to exert a biasing force, wherein the biasing member is retained within the recess of the lower track fitting and positioned relative to the button to exert the biasing force against the button, and wherein the biasing force urges the button through the aperture of the cam member such that the indicator surface of the button is visible through the aperture of the cam member if the track fitting assembly is in the engaged position, and the aperture of the cam member includes a generally hexagonal profile.

17. The track fitting assembly of claim 16, wherein the cam member includes a second indicator surface that is visible if the track fitting assembly is in the unengaged position.

18. The track fitting assembly of claim 16, wherein the at least one retaining feature of the lower track fitting is at least one head portion including a generally rounded profile.

* * * * *